(12) United States Patent
Obara et al.

(10) Patent No.: US 6,739,647 B2
(45) Date of Patent: May 25, 2004

(54) TAILORED BLANK ARTICLE AND MANUFACTURING METHOD OF THE SAME

(75) Inventors: Hisashi Obara, Akishima (JP); Hiroyuki Komatsu, Akishima (JP); Noriyuki Yanase, Akishima (JP); Kouji Shimohigashi, Wako (JP); Kazumi Kodama, Wako (JP); Hirokazu Watanabe, Wako (JP); Fumiaki Niisato, Wako (JP)

(73) Assignees: Kikuchi Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/414,926

(22) Filed: Apr. 16, 2003

(65) Prior Publication Data

US 2003/0193214 A1 Oct. 16, 2003

Related U.S. Application Data

(63) Continuation of application No. 09/937,119, filed as application No. PCT/JP01/01229 on Feb. 21, 2001, now Pat. No. 6,601,909.

(30) Foreign Application Priority Data

Mar. 13, 2000 (JP) ........................................ 2000-068503

(51) Int. Cl.$^7$ ............................................... B62D 25/08
(52) U.S. Cl. .......................... 296/191; 296/70; 296/29; 29/460
(58) Field of Search ........................... 296/191, 192, 296/194, 203.02, 70, 29, 30; 29/460, 527.2, 527.5

(56) References Cited

U.S. PATENT DOCUMENTS

| | | | |
|---|---|---|---|
| 4,366,972 A | 1/1983 | Franklin |
| 5,274,897 A | 1/1994 | Mieszelewicz et al. |
| 5,600,991 A | 2/1997 | Munzen |
| 5,789,718 A | 8/1998 | Fukushima et al. |
| RE36,612 E | 3/2000 | Fukushima et al. |
| 6,270,152 B1 | 8/2001 | Sato |
| 6,371,551 B1 | 4/2002 | Hedderly |

FOREIGN PATENT DOCUMENTS

| | | |
|---|---|---|
| JP | 58-13483 | 1/1983 |
| JP | 58-115468 | 8/1983 |

(List continued on next page.)

*Primary Examiner*—Patricia L. Engle
(74) *Attorney, Agent, or Firm*—Flynn, Thiel, Boutell & Tanis, P.C.

(57) ABSTRACT

A tailored blank article and a manufacturing method thereof, which is used for partitioning an inside and an outside such as a dashboard panel for partitioning an engine room of a car body and the inside of a car room. A thick plate blank and a thin plate blank are joined by a mash-seam welding or a laser welding, and are subjected to a pressing. Thereby, the thin plate blank is bent until an inner surface of the thin plate blank is made flush or almost flush with an inner surface of the thick plate blank, subsequently, a connection part having a portion connected over a welding portion is connected to at least one of an outer surface and the inner surface of the tailored blank article comprising the thick plate blank and the thin plate blank, and then an entire tailored article including the connection part is coated. The connection of the connection part to the tailored blank article, which is performed before the coating, is performed with a portion which corresponds to a welding portion of the connection part spaced from the welding portion, to thereby form a coating film securely onto the welding portion.

11 Claims, 18 Drawing Sheets

FOREIGN PATENT DOCUMENTS

| | | |
|---|---|---|
| JP | 59-172678 | 11/1984 |
| JP | 60-56490 | 4/1985 |
| JP | 60-58337 | 4/1985 |
| JP | 61-9381 | 1/1986 |
| JP | 61-63386 | 4/1986 |
| JP | 61-105275 | 5/1986 |
| JP | 61-185590 | 11/1986 |
| JP | 63-107287 | 7/1988 |
| JP | 4-71382 | 6/1992 |
| JP | 7-132386 | 5/1995 |
| JP | 10-24374 | 1/1998 |
| JP | 11-19787 | 1/1999 |
| JP | 11-47946 | 2/1999 |
| JP | 11-104749 | 4/1999 |
| JP | 2000-24721 | 1/2000 |
| WO | WO 96/26037 | 8/1996 |

F I G. 3
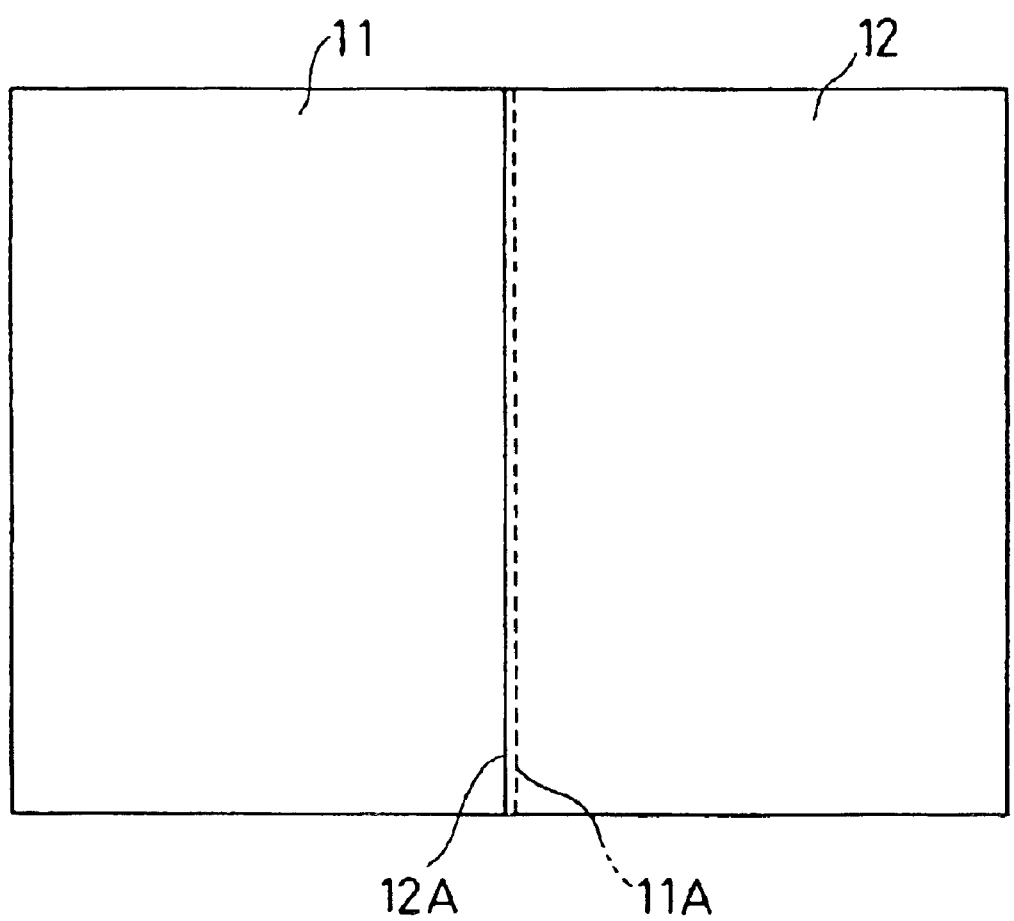

F I G. 1 3
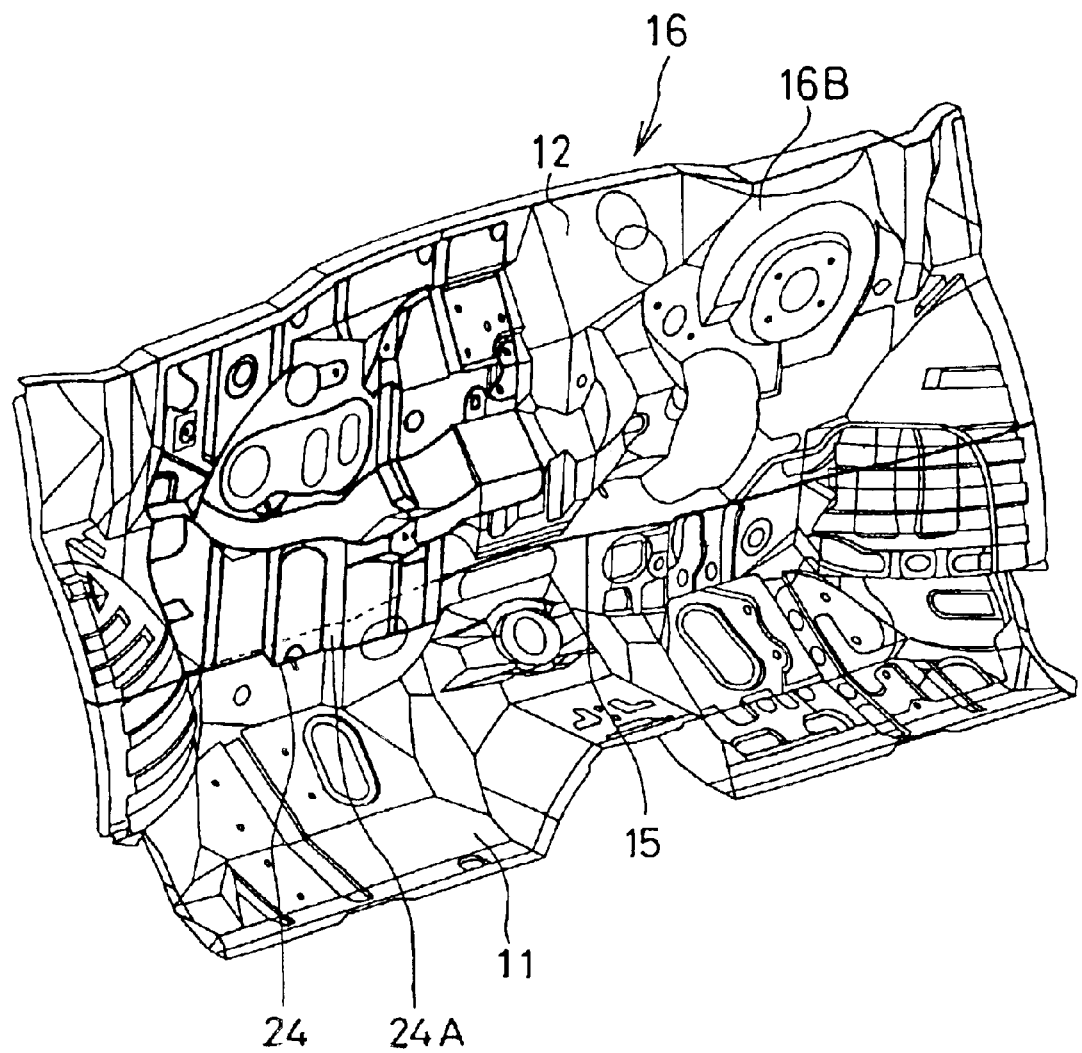

TAILORED BLANK ARTICLE AND MANUFACTURING METHOD OF THE SAME

This is a continuation of Ser. No. 09/937,119, filed Sep. 21, 2001 now U.S. Pat. No. 6,601,909, which was the national stage of International Application No. PCT/JP01/01229, filed Feb. 21, 2001.

TECHNICAL FIELD

This invention relates to a tailored blank article and a manufacturing method thereof, which is manufactured by a tailored blank obtained by welding a plurality of blanks, and, for example, is applied to an article used at the position where the inside and the outside are partitioned or an article having a portion for partitioning the inside and the outside, such as a dashboard panel of an automobile.

BACKGROUND ART

A dashboard panel of an automobile is a partition article for partitioning the inside and the outside since it partitions an engine room to be exposed to the outside air and a car room to be cut off from the air. As disclosed in Japanese Utility Model Laid-open No. Sho 59-172678, in a conventional dashboard panel, a lower panel made of a thick plate and an upper panel made of a thin plate are joined together by a spot welding.

This kind of dashboard panel is manufactured by pressing a thick plate blank and a thin plate blank into predetermined shapes to produce the lower panel and the upper panel, joining these panels by the spot welding, performing a waterproofing to a space between these panels, and coating an entire body.

When manufacturing an article for a car body of the automobile other than the dashboard panel, which is used at the position where the inside and the outside of the car room are partitioned, by spot welding a plurality of panels produced by the blanks, it was conventionally manufactured by undergoing the same process as that of the aforesaid dashboard panel.

According to this conventional technology, the spot welding is performed after a plurality of the blanks are subjected to the pressing to manufacture a plurality of the panels in predetermined shapes, which makes it necessary to prepare a press die for each blank, thus causing the disadvantage that its cost becomes high. Further, since the panels between a plurality of spot welding portions which are scattered about are not joined together, it is necessary to perform an extra waterproofing in order to prevent a formation of rust by an entering of the waterdrop thereinto, which causes the disadvantage that the productivity becomes difficult to be increased.

An object of the present invention is to provide a tailored blank article and a manufacturing method thereof, which is capable of reducing the number of the press dies compared with the conventional art and making it unnecessary to perform the extra waterproofing in order to prevent the formation of rust.

DISCLOSURE OF THE INVENTION

A tailored blank article according to the present invention is manufactured by using two blanks with these overlapped end portions joined together by a mash-seam welding and pressed as at least a part of material for manufacturing, and a portion made of the two blanks makes a partition portion for partitioning the inside and the outside.

In this tailored blank article, since the overlapped end portions of the two blanks are joined by the mash-seam welding, a pressing into a predetermined shape is performed after the blanks are joined by the mash-seam welding. Therefore, it is unnecessary to prepare a press die for each blank. Further, even if a portion made of the two blanks makes a portion for partitioning the inside and outside, the blanks are joined together without leaving any space therebetween by the mash-seam welding, which makes it unnecessary to perform an extra waterproofing in order to prevent a formation of rust.

Moreover, in the tailored blank article, the blanks are joined together by the mash-seam welding so that higher joining strength can be obtained than in a spot welding, and further, an overlap margin of the end portions can be reduced more than in the spot welding so that the weight reduction and the improvement of material yield can be achieved.

In the tailored blank article, when the two blanks are a thick plate blank and a thin plate blank and the mash-seam welding is performed while the end portion of an outer surface of the thick plate blank to be exposed to the outside is overlaid on the end portion of an inner surface of the thin plate blank, the thin plate blank may be bent until the inner surface of the thin plate blank is made flush or almost flush with an inner surface of the thick plate blank.

Thereby, even if the two blanks are the thick plate blank and the thin plate blank which differ in thickness, the inner surfaces of these blanks are made flush or almost flush with each other, and hence the inner surfaces thereof can be attaching surfaces for attaching other parts.

Further, the tailored blank article according to the present invention is manufactured by using two blanks with these matched end portions joined together by a laser welding and pressed as at least a part of material for manufacturing, and a portion made of the two blanks make a partition portion for partitioning the inside and the outside.

In the tailored blank article, since the matched end portions of the two blanks are joined by the laser welding, a pressing into a predetermined shape is performed after the blanks are joined by the laser welding. Therefore, it is unnecessary to prepare a press die for each blank in this tailored blank article, too. Further, even if a portion made of the two blanks makes a portion for partitioning the inside and outside, the blanks are joined together without leaving any space therebetween by the laser welding, which makes it unnecessary to perform an extra waterproofing in order to prevent a formation of rust, similarly to the case of the mash-seam welding.

Moreover, in the tailored blank article, the blanks are joined together by the laser welding so that higher joining strength can be obtained than in a spot welding, and further, unlike the spot welding, it is unnecessary to overlap the end portions of the blanks so that the further weight reduction and the improvement of material yield can be achieved.

In the tailored blank article, when the two blanks are a thick plate blank and a thin plate blank and respective outer surfaces to be exposed to the outside of the thick plate blank and the thin plate blank are made flush or almost flush with each other, the thin plate blank may be bent until an inner surface of the thin plate blank is made flush or almost flush with an inner surface of the thick plate blank.

Thereby, even if the two blanks are the thick plate blank and the thin plate blank which differ in thickness, the inner surfaces of these blanks are made flush or almost flush with each other, and hence the inner surfaces thereof can be the attaching surfaces for attaching other parts.

In the tailored blank article by both of the mash-seam welding and the laser welding as described above, when a connection part is provided, which is connected to at least one of an outer surface and the inner surface of the two blanks over a welding portion, a portion in the connection part which corresponds to the welding portion is made to be spaced from the welding portion.

Thereby, when the coating is performed onto the surface connected with the connection part in order to ensure durability, after the connection of the connection part, the welding portion by the mash-seam welding and the welding portion by the laser welding can be securely coated.

A method for manufacturing the tailored blank article according to the present invention, which has at least a portion made of the thick plate blank and the thin plate blank as a partition portion for partitioning the inside and the outside, comprising the steps of: joining the end portion of the thick plate blank and the end portion of the thin plate blank while the inner surface of the thin plate blank is overlaid on the outer surface of the thick plate blank to be exposed to the outside by a mash-seam welding, pressing these blanks, bending the thin plate blank until the inner surface of the thin plate blank is made flush or almost flush with the inner surface of the thick plate blank, and thereafter coating at least one of the outer surface and the inner surface of the thick plate blank and the thin plate blank including the mash-seam welding portion.

In this method for manufacturing the tailored blank article, the blanks are subjected to the pressing into the predetermined shape after they are joined by the mash-seam welding, it is unnecessary to prepare the press die for each blank. Further, the blanks are joined together without leaving any space therebetween by the mash-seam welding, which makes it unnecessary to perform the extra waterproofing in order to prevent the formation of rust. Moreover, the blanks are joined together by the mash-seam welding with higher joining strength than in the spot welding, and further, the overlap margin of the end portions of the blanks can be reduced in the mash-seam welding than in the spot welding, so that the weight reduction and the improvement of material yield can be achieved.

Further, in this method for manufacturing the tailored blank article, when the inner surface of the thin plate blank is overlaid on the outer surface of the thick plate blank to be exposed to the outside to perform the mash-seam welding, the inner surface of the thin plate blank is bent until it is made flush or almost flush with the inner surface of the thick plate blank, and hence the inner surfaces thereof can be the attaching surfaces for attaching other parts.

Furthermore, the method for manufacturing the tailored blank article according to the present invention, which has at least a portion made of the thick plate blank and the thin plate blank as the partition portion for partitioning the inside and the outside, comprising the steps of: joining the matched end portions of the thick plate blank and the thin plate blank with the respective outer surfaces of these blanks made flush or almost flush with each other by the laser welding, then pressing these blanks, bending the thin plate blank until the inner surface of the thin plate blank is made flush or almost flush with the inner surface of the thick plate blank, and subsequently coating at least one of the outer surface and the inner surface of the thick plate blank and the thin plate blank including the laser welding portion.

In this method for manufacturing the tailored blank article, the blanks are subjected to the pressing into the predetermined shape after they are joined by the laser welding, and therefore it is unnecessary to prepare the press die for each blank similarly to the case of the mash-seam welding. Further, the blanks are joined together without leaving any space therebetween by the laser welding, which makes it unnecessary to perform the extra waterproofing in order to prevent the formation of rust. Moreover, the blanks are joined together by the laser welding with higher joining strength than in the spot welding, and further, unlike the spot welding, it is unnecessary to overlap the end portions of the blanks in the laser welding, so that the further weight reduction and the improvement of material yield can be achieved.

Furthermore, in this method for manufacturing the tailored blank article, when the laser welding is performed with respective outer surfaces of the thick plate blank and the thin plate blank made flush or almost flush with each other, the thin plate blank is bent until the inner surface of the thin plate blank is made flush or almost flush with the inner surface of the thick plate blank, and hence the inner surfaces thereof can be the attaching surfaces for attaching other parts, similarly to the case of the mash-seam welding.

In the method of manufacturing the tailored blank article by both of the mash-seam welding and the laser welding as described above, when the connection part is provided, which is connected to at least one of the outer surface and the inner surface of the thick plate blank or the thin plate blank over the welding portion, the connection part is connected to the surface of the thick plate blank and the thin plate blank to which the connection part is connected, while the portion to be connected over the welding portion is spaced from the welding portion, and then the coating is performed.

Thereby, when the coating is performed to ensure durability onto the surface of the thick plate blank and the thin plate blank to which the connection part is connected after the connection of the connection part, the mash-seam welding portion and the laser welding portion can be securely coated. Thus, the formation of rust from the welding part can be effectively prevented by a coating film.

Moreover, in the method of manufacturing the tailored blank article by both of the mash-seam welding and the laser welding as described above, the bending of the thin plate blank until the inner surface of the thin plate blank is made flush or almost flush with the inner surface of the thick plate blank may be performed as a part of the working process of the pressing when the joined thick plate blank and the thin plate blank are subjected to the pressing, or may be performed before or after the pressing as a working process which is different from the pressing.

Furthermore, in the tailored blank article and the manufacturing method thereof according to the present invention as described above, the bending of the thin plate blank until the inner surface of the thin plate blank is made flush or almost flush with the inner surface of the thick plate blank means that at a position in the inner surface of the thick plate blank which is a flat surface, the inner surface of the thin plate blank is subjected to the bending to a position which corresponds or almost corresponds to an extension of a straight line from the inner surface of the thick plate blank so that the inner surface of the thin plate blank is made to be a flat surface, and further, at a position in the inner surface of the thick plate blank which is a curved surface, the thin plate blank is subjected to the bending to a position which corresponds or almost corresponds to an extension of a curved line from the inner surface of the thick plate blank so that the inner surface of the thin plate blank is made to be a curved surface.

The blank which can be used in the tailored blank article and the manufacturing method thereof according to the present invention as described above is the one of a metallic plate, especially of a hot rolled steel plate and a cold rolled steel plate. The present invention can be applied to a steel plate having a thickness of 0.7 mm to 3.2 mm, and the steel plate may be without a surface treatment of a plating and the like or may be performed with the surface treatment of a zinc plating and the like. Further, in the present invention, the steel plate with various strength, from a soft steel plate to a high tensile steel plate of 690 MPA class can be used.

Moreover, in the present invention, the coating may be an electrode position coating or may be a spray coating.

The present invention can be applied to an article having a part for partitioning the inside and the outside at least in part thereof. An example is a dashboard panel in the case of a car body of an automobile. Other examples of the car body of the automobile are an article made of a front wheel house and a front side frame, an article made of a rear wheel house and a rear side panel inner, and so on.

When the tailored blank article according to the present invention is the dashboard panel, a material of the lower side of the dashboard panel is the thick plate blank and a material of the upper side thereof is the thin plate blank, and the thin plate blank is bent until the inner surface of the thin plate blank, which forms a space inside a car room, is made flush or almost flush with the inner surface of the thick plate blank.

With this dashboard panel, the material of the lower side thereof is the thick plate blank so that strength in this portion can be set so as to bear a load from the front side frame effectively in a collision of the automobiles, and further, the material of the upper side thereof is the thin plate blank so that the entire weight of the dashboard lower panel can be decreased.

Moreover, with this dashboard panel, the respective outer surfaces of the thick plate blank and the thin plate blank, which form an engine room are made uninterrupted or almost uninterrupted by the mash-seam welding or the laser welding, and the thin plate blank is bent until the inner surface of the thin plate blank, which forms the space inside the car room, is made flush or almost flush with the inner surface of the thick plate blank, which makes it possible to prevent a formation of a concave portion and a portion with a difference in level in which the waterdrop is likely to be collected in the outer surface of the engine room side. Thereby, the formation of rust can be prevented from this outer surface to be exposed to the outside.

In order to manufacture the dashboard panel like this according to the manufacturing method of the tailored blank article as described above, the thick plate blank is prepared as the material of the lower side of the dashboard panel and the thin plate blank is prepared as the material of the upper side thereof, the thick plate blank and the thin plate blank are joined together by the mash-seam welding or the laser welding, and the thin plate blank is bent until the inner surface of the thin plate blank, which forms the space inside the car room, is made flush or almost flush with the inner surface of the thick plate blank.

Further, when the tailored blank article and the manufacturing method thereof according to the present invention is applied to the dashboard panel, an example of the connection part connected to at least one of the outer surface and the inner surface of the two blanks over the mash-seam welding portion or the laser welding portion is the front side frame, and other examples are an insulator panel for sound insulation and a reinforcing panel.

Furthermore, the present invention can be applied to articles other than the car body of the automobile, for example, to an outer plate of a small craft, an inner plate of a washing machine tub, an outer plate of a television, an outer panel of a kerosene stove, an outer frame of a personal computer, and so on.

BRIEF DESCRIPTION OF DRAWINGS

FIG. 3 is a plane view showing a state of the thick plate blank and the thin plate blank with these end portions overlapped for a mash-seam welding;

FIG. 13 is a perspective view of the dashboard lower panel connected with a reinforcing panel seen from the car room;

BEST MODE FOR CARRYING OUT THE INVENTION

Preferred embodiments will be described with reference to the attached drawings in order to explain the present invention in detail.

Figure 1:
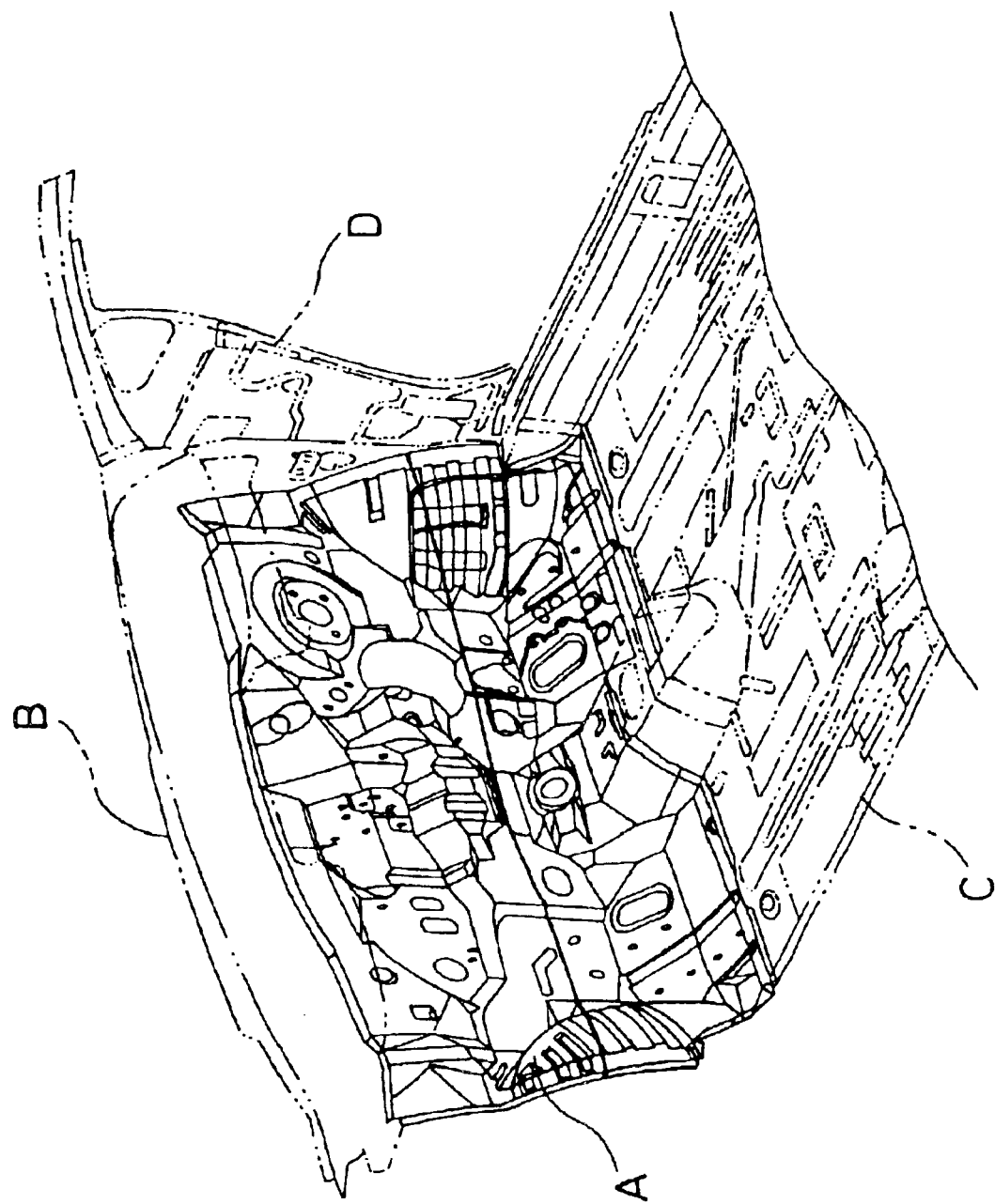
FIG. 1 is a perspective view of a part of a car body of an automobile manufactured by using a dashboard lower panel of a tailored blank article according to the present invention seen from a car room, in which only the dashboard lower panel is shown in a full line.

The embodiment described below is for a dashboard panel of a car body of an automobile which is formed with tailored articles, especially for a dashboard lower panel. FIG. 1 shows a part of the car body of the automobile, in which the part of the car body is formed by joining a dashboard upper panel B, a front lower panel C and a front pillar inner lower panel D to a dashboard lower panel A.

Figure 2:
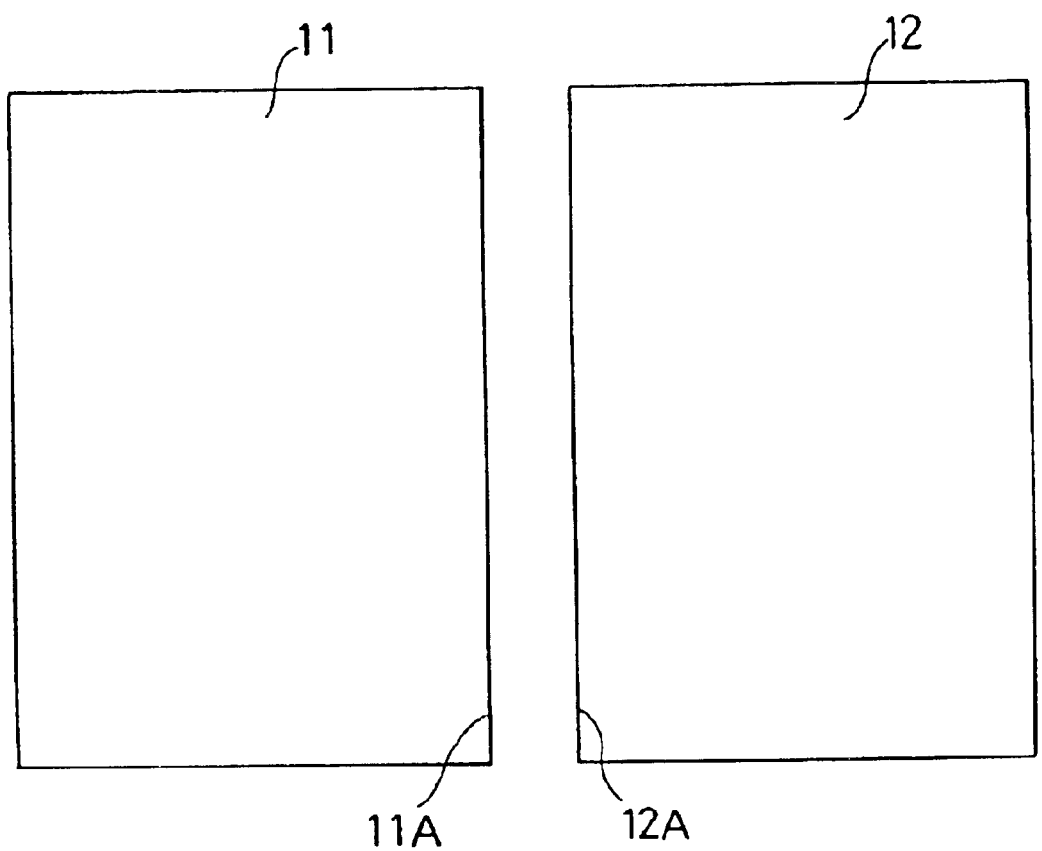
FIG. 2 is a plane view of a thick plate blank and a thin plate blank as materials for manufacturing the dashboard lower panel.
Figure 4:
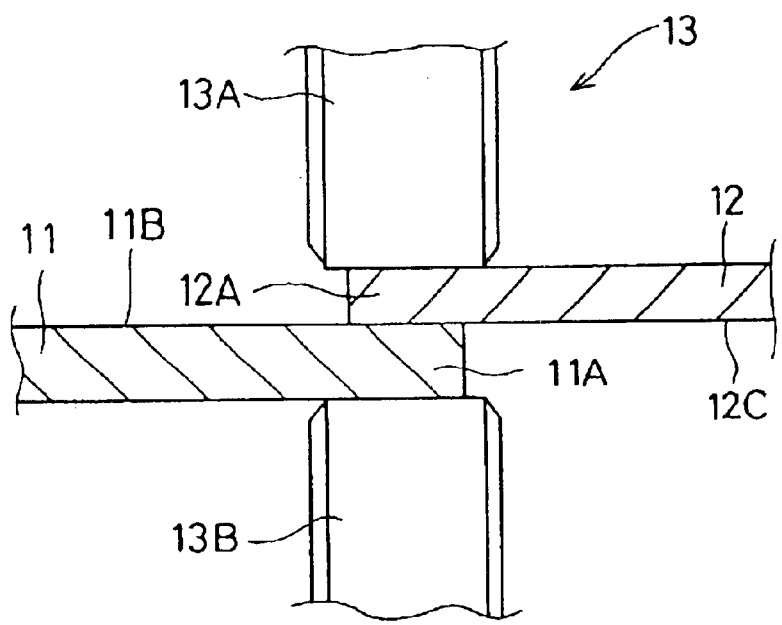
FIG. 4 is a vertical sectional view of the thick plate blank and the thin plate blank in the mash-seam welding.

FIG. 2 to FIG. 13 show the embodiment in which a dashboard lower panel is manufactured by a mash-seam welding. As shown in FIG. 2, materials of the dashboard lower panel are a thick plate blank 11 and a thin plate blank 12 both of which are made of a steel plate, and end portions 11A and 12A of the blanks 11 and 12 overlap each other when joined by the mash-seam welding as shown in FIG. 3. As shown in FIG. 4, they are overlapped with the thick plate blank 11 at the lower side and the thin plate blank 12 at the upper side. Thereby, when the dashboard lower panel is formed of the thick plate blank 11 and the thin plate blank 12, an inner surface 12C of the thin plate blank 12 which is an inner side of a car room to be cut off from the outside air is overlaid on an outer surface 11B of the thick plate blank 11 which is an engine room side to be exposed to the outside air. The thick plate blank 11 and the thin plate blank 12 are clamped together under this condition.

Figure 5:
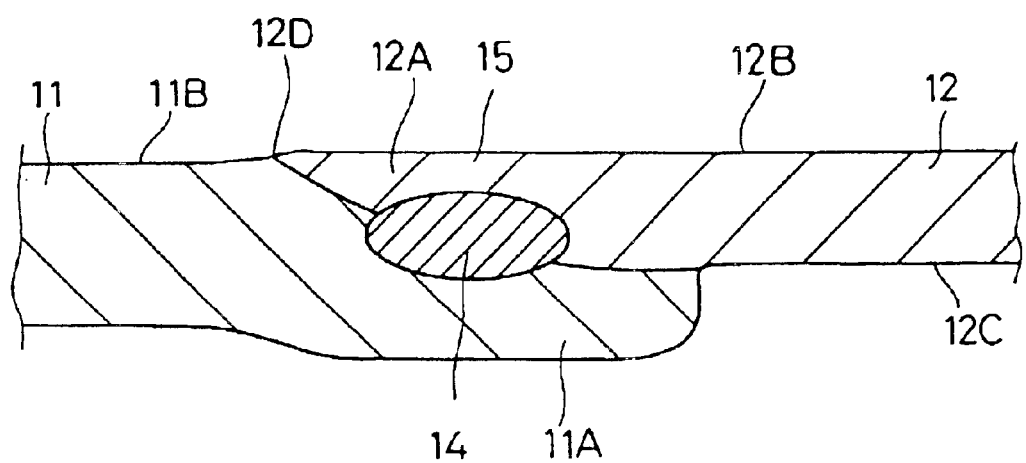
FIG. 5 is a vertical sectional view of the thick plate blank and the thin plate blank after the mash-seam welding.

A mash-seam welding device 13 for joining the end portions 11A and 12A of the blanks 11 and 12 has upper and lower electrode rollers 13A and 13B for pressurizing and mashing the end portions 11A and 12A. The electrode rollers 13A and 13B move by rolling along the end portions 11A and 12A while being applied with an electric current between these electrode rollers 13A and 13B. Thereby, as shown in FIG. 5, the end portion 11A and the end portion 12A are mashed and joined with a formation of a nugget 14 between the end portions 11A and 12A, whereby a mash-seam welding portion 15 which has less thickness than the thick plate blank 11 and the thin plate blank 12 in total is formed at positions of the end portions 11A and 12A. This mash-seam welding allows the outer surface 11B of the thick plate blank 11 and an outer surface 12B of the thin plate blank 12, which make the surface of the engine room side of the dashboard lower panel, to be made uninterrupted or almost interrupted.

It should be mentioned that an edge portion 12D which is an end of the outer surface 12B of the thin plate blank 12 on the thick plate blank 11 side may have a slight difference in level to the outer surface 11B of the thick plate blank 11, but if the difference is significant, a coating film is hard to be formed on the surface of the edge portion 12D when an electrode position coating which is described later is performed, which results in a formation of rust from the edge portion 12D. Therefore, a pressure volume which is applied to the blanks 11 and 12 by the electrode rollers 13A and 13B in the mash-seam welding and other conditions are set up so as to prevent the edge portion 12D from having the significant difference in level.

Figure 6:
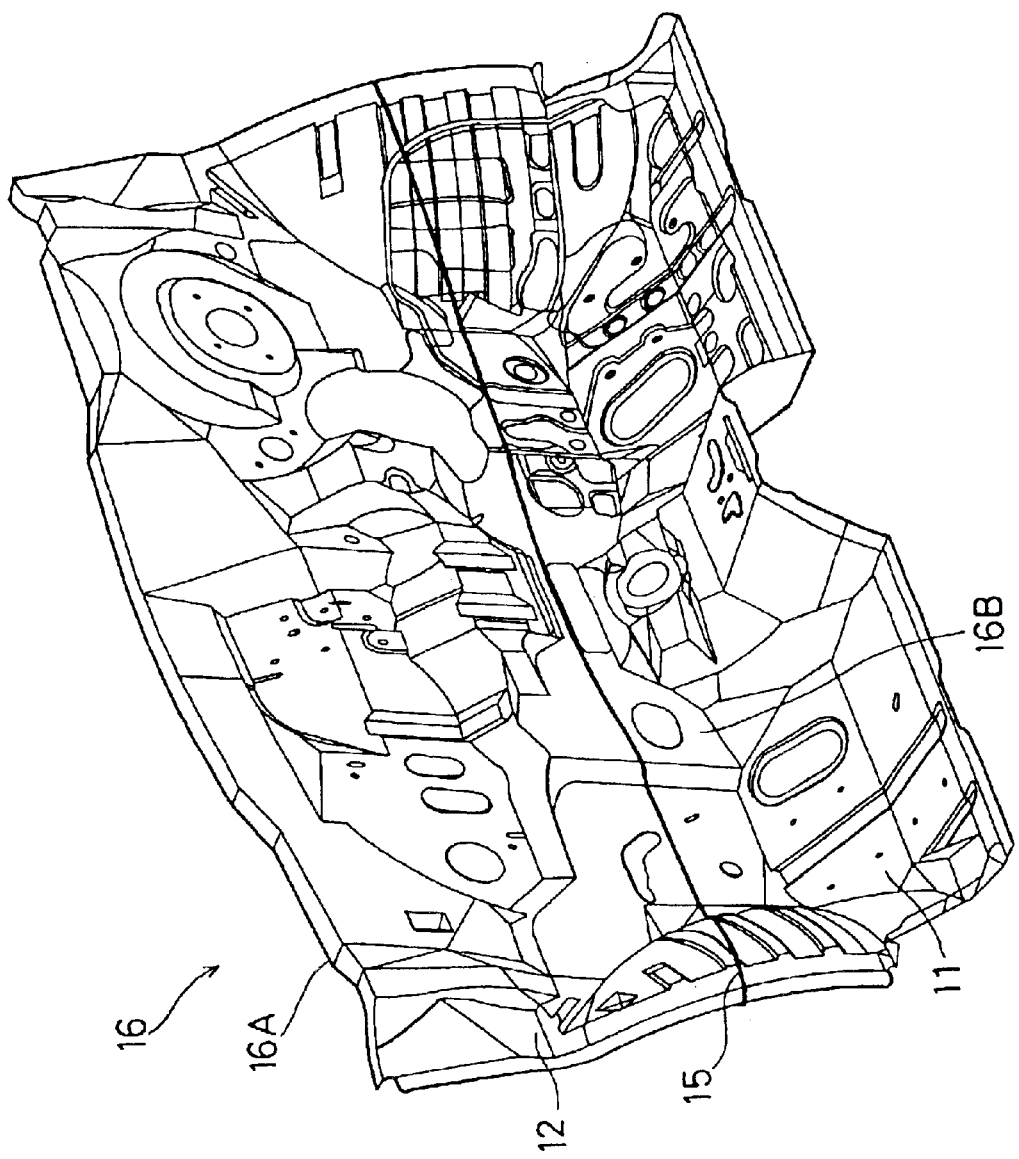
FIG. 6 is a perspective view of the dashboard lower panel manufactured by a transfer pressing of the thick plate blank and the thin plate blank which are joined by the mash-seam welding seen from the car room.

Subsequently, the thick plate blank 11 and the thin plate blank 12 are sent to a press process to undergo a transfer pressing. The thick plate blank 11 and the thin plate blank 12 are subjected to various processings such as a drawing, a piercing and a trimming in due order, whereby the blanks 11 and 12 are processed to predetermined shapes, and a dashboard lower panel 16 is manufactured as shown in FIG. 6. FIG. 6 is a perspective view of the dashboard lower panel 16 seen from the inside of the car room.

Figure 7:
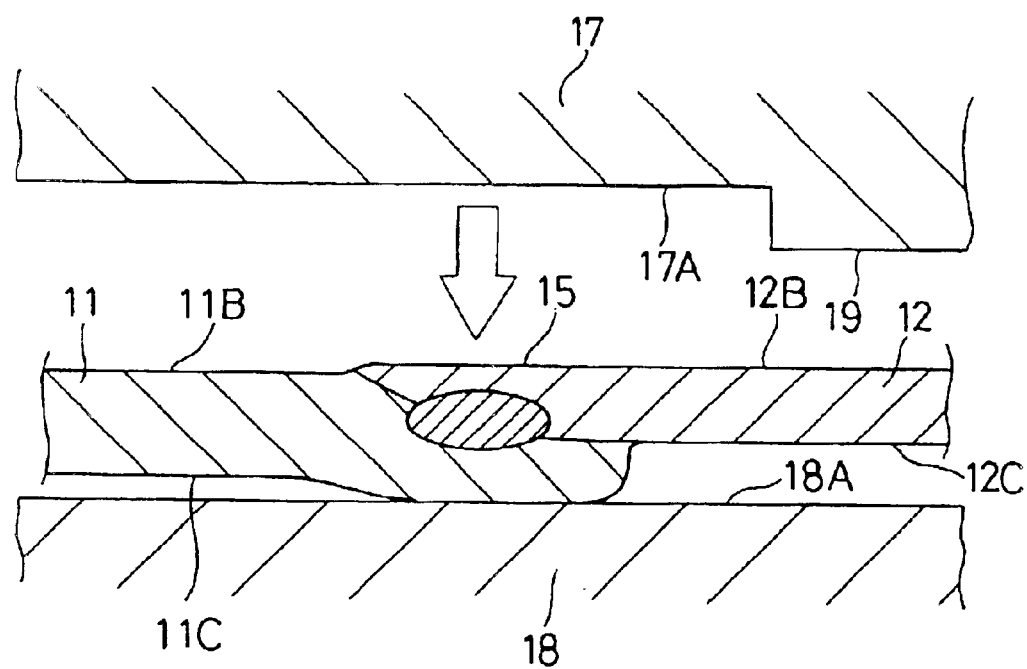
FIG. 7 is a vertical sectional view showing a state in which the thin plate blank undergoes a pressing so as to make an inner surface of the thick plate blank and an inner surface of the thin plate blank flush or almost flush with each other.

As one operation of the transfer pressing for manufacturing the dashboard lower panel 16, a bending of the thin plate blank 12 is performed as shown in FIG. 7. The bending is performed by using an upper die 17 and a lower die 18, in which an upper surface 18A of the lower die 18 is an even surface, whereas a protrusion 19 which protrudes downwardly is provided at a lower surface 17A of the upper die 17 in a position which is slightly displaced from the mash-seam welding portion 15 to the thin plate blank 12 side. Therefore, the thin plate blank 12 is subjected to the bending by the protrusion 19.

Figure 8:
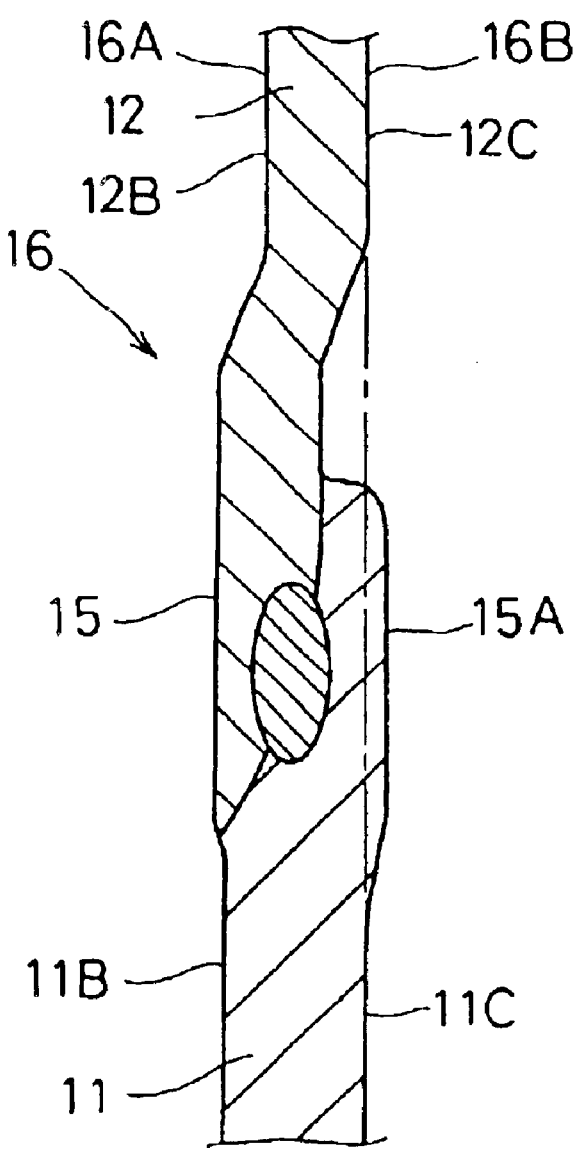
FIG. 8 is a vertical sectional view of the thick plate blank and the thin plate blank after the pressing.

As a result, as shown in FIG. 8, an inner surface 11C of the thick plate blank 11 and the inner surface 12C of the thin plate blank 12 are made flush or almost flush with each other. At a position of the thick plate blank 11 as shown in FIG. 8, since the inner surface 11C of the thick plate blank 11 is a flat surface, the thin plate blank 12 is subjected to the bending to a position which corresponds or almost corresponds to an extension of a straight line from the inner surface 11C, and the inner surface 12C of the thin plate blank 12 is also made to be a flat surface. Meanwhile, at a position where the inner surface 11C of the thick plate blank 11 is a curved surface, the thin plate blank 12 is subjected to the bending to a position which corresponds or almost corresponds to an extension of a curved line from the inner surface 11C of the thick plate blank 11, and the inner surface 12C of the thin plate blank 12 is made to be a curved surface which has continuity with the inner surface 11C of the thick plate blank 11, except for the mash-seam welding portion 15.

Incidentally, a bulge portion 15A of the mash-seam welding portion 15, which expands from the inner surface 11C may be extinguished by applying pressure thereto, when the pressing is performed by the upper die 17 and the lower die 18.

Figure 9:
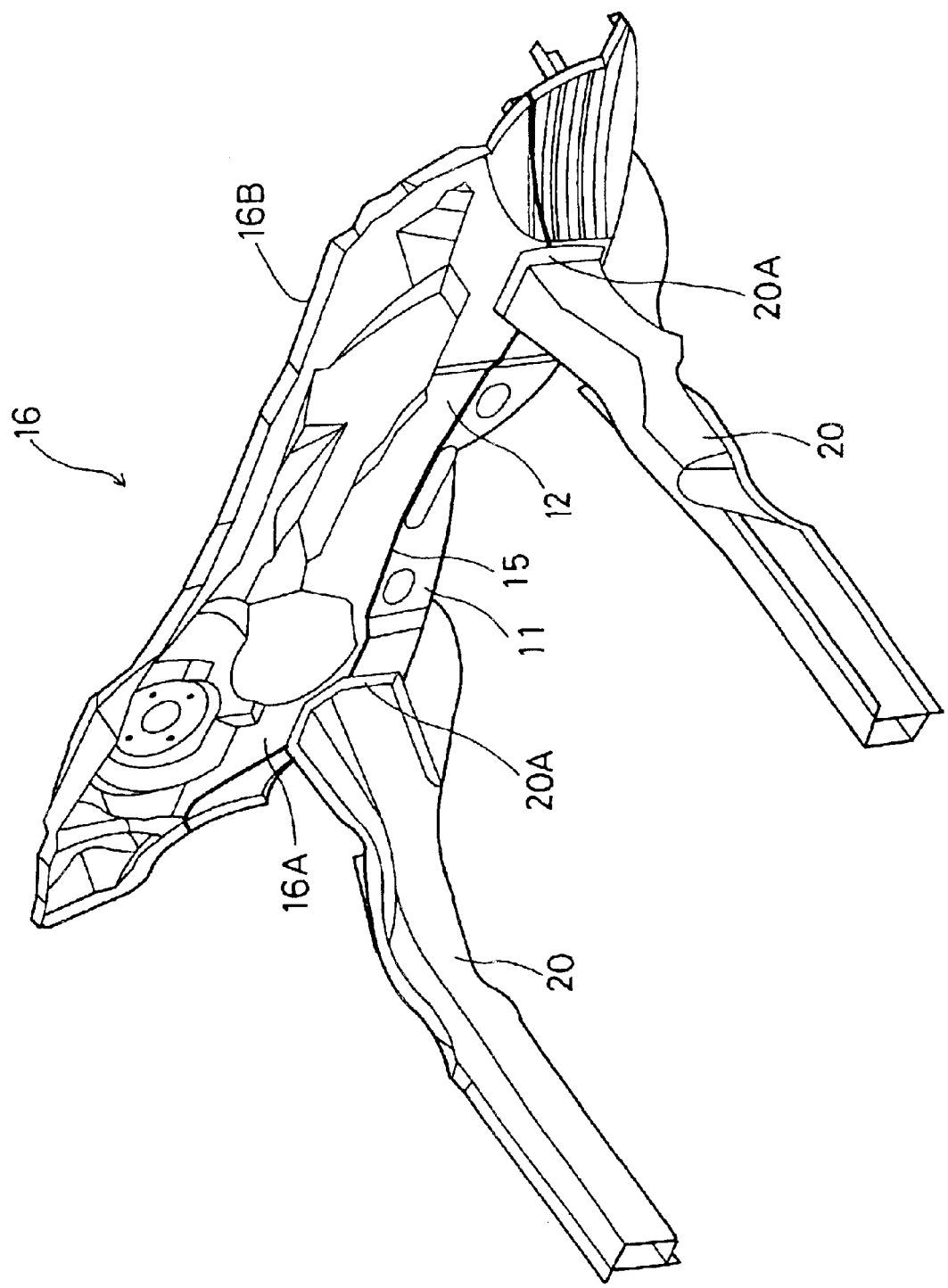
FIG. 9 is a perspective view of the dashboard lower panel connected with a front side frame seen from an engine room side.
Figure 10:
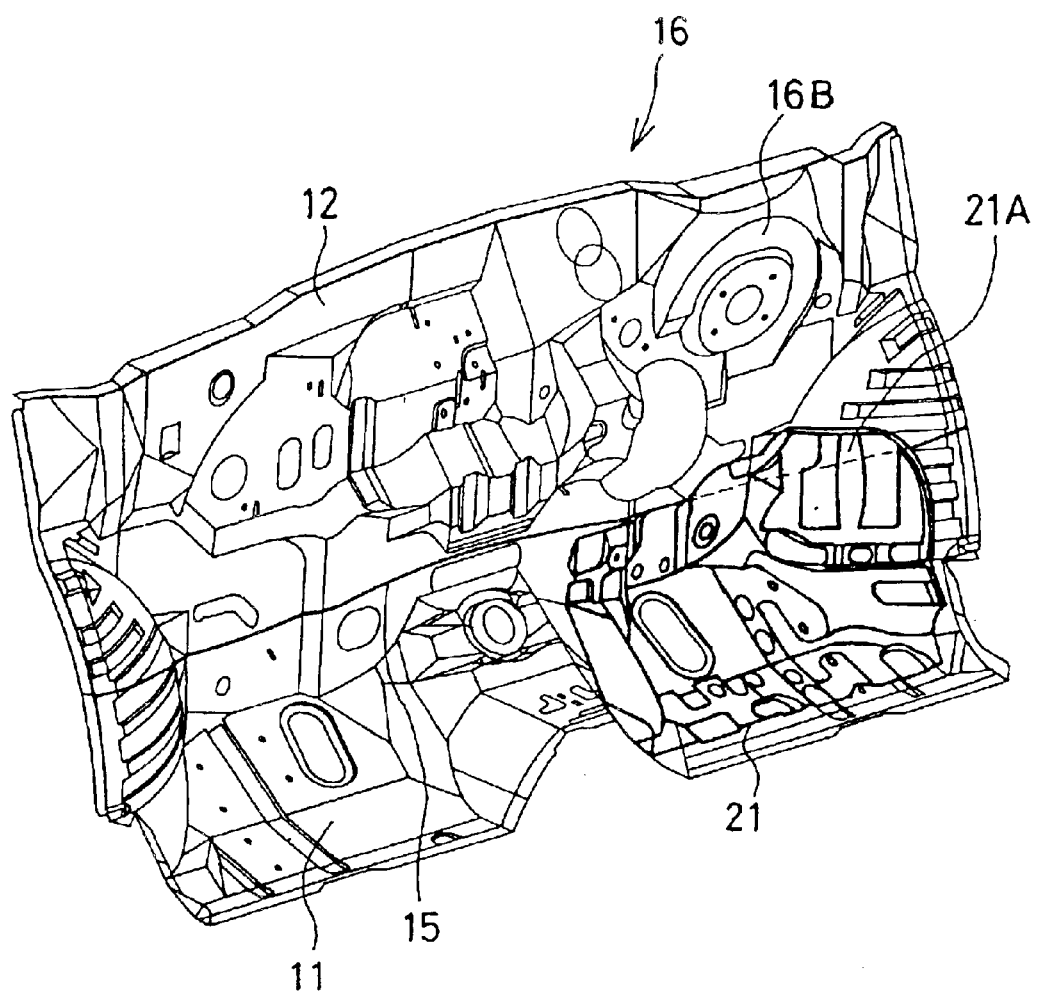
FIG. 10 is a perspective view of the dashboard lower panel connected with an insulator panel for sound insulation seen from the car room side.

Thus, after the dashboard lower panel 16 in which the inner surface 11C of the thick plate blank 11 and the inner surface 12C of the thin plate blank 12 are made flush or almost flush with each other is manufactured, a front side frame 20 as a connection part connected over the mash-seam welding portion 15 is joined to an outer surface 16A of the dashboard lower panel 16 which comprises the outer surface 11B of the thick plate blank 11 and the outer surface 12B of the thin plate blank 12 by a spot welding, as in FIG. 9 showing the dashboard lower panel 16 seen from the engine room side. Moreover, an insulator panel 21 for sound insulation as a connection part connected over the mash-seam welding portion 15 is joined to an inner surface 16B of the dashboard lower panel 16 which comprises the inner surface 11C of the thick plate blank 11 and the inner surface 12C of the thin plate blank 12, which are made flush or almost flush with each other by the spot welding, as shown in FIG. 10.

Figure 11:
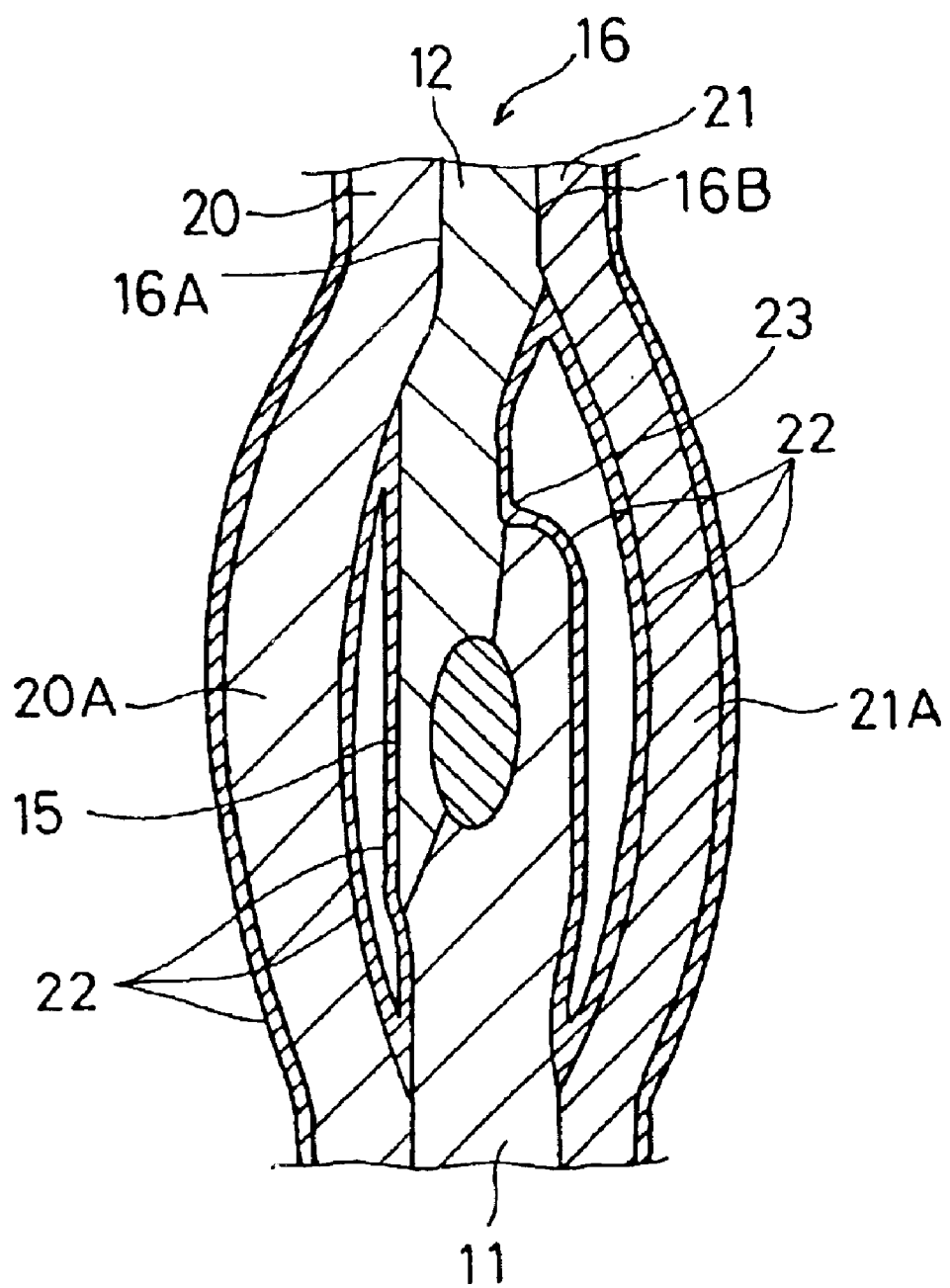
FIG. 11 is a vertical sectional view of a mash-seam welding portion of the dashboard lower panel connected with the front side frame to the outer surface thereof and the insulator panel for sound insulation to the inner surface thereof.

As shown in FIG. 11, a portion 20A in the front side frame 20, which corresponds to the mash-seam welding portion 15 is spaced from the mash-seam welding portion 15 since it is curved slightly in an outward direction from the dashboard lower panel 16. Further, a portion 21A in the insulator panel 21, which corresponds to the mash-seam welding portion 15, is also spaced from the mash-seam welding portion 15 since it is curved slightly in an outward direction from the dashboard lower panel 16.

As described above, the front side frame 20 and the insulator panel 21 are attached to the dashboard lower panel 16, further, the dashboard lower panel, the dashboard upper panel, the front lower panel, the front pillar inner lower panel and so on which comprise the car body are joined together to complete the car body, and thereafter, the car body is immersed into a tank of an electrode position coating device to be subjected to the electrode position coating. In this electrode position coating, even if the mash-seam welding portion 15 of the dashboard lower panel 16 is partially covered with the front side frame 20 and the insulator panel 21, an electrode position coating solution certainly enters and adheres to the mash-seam welding portion 15 because the portion 20A in the front side frame 20 which corresponds to the mash-seam welding portion 15 and the portion 21A in the insulator panel 21 which corresponds to the mash-seam welding portion 15 do not contact closely with the mash-seam welding portion 15 and are spaced from the welding portion 15. Thereby, a coating film 22 is securely formed on the surface of the mash-seam welding portion 15 by the electrode position coating. Further, the outer surface 16A which is not covered with the front side frame 20 and the inner surface 16B which is not covered with the insulator panel 21 in the dashboard lower panel 16 are coated with the coating film 22.

According to the above embodiment, the dashboard lower panel 16 as a partition article for partitioning the inside and the outside of the automobile, that is, the car room and the engine room, is manufactured by joining the end portions 11A and 12A of the thick plate blank 11 and the thin plate blank 12 together by the mash-seam welding, and then pressing the thick plate blank 11 and the thin plate blank 12, which makes it unnecessary to prepare a press die each for the thick plate blank 11 and the thin plate blank 12, in contrast to the case where the dashboard lower panel is manufactured by joining the thick plate blank and the thin plate blank by the spot welding after the pressing. Therefore, the number of the dies can be reduced and the cost for the dies can be reduced. Further, the blanks are joined together without leaving any space therebetween by the mash-seam welding, which makes it unnecessary to perform an extra waterproofing onto the manufactured dashboard lower panel 16 as a post-processing in order to prevent the formation of rust, and hence the number of working process can be reduced and the productivity can be increased.

Moreover, the mash-seam welding has higher joining strength than that of the spot welding so that the thick plate blank 11 and the thin plate blank 12 can be joined together with higher strength. Further, an overlap margin of the end portions 11A and 12A of the thick plate blank 11 and the thin plate blank 12 can be reduced in the mash-seam welding than in the spot welding so that the weight of the dashboard lower panel 16 can be decreased by the same weight thereof and material yield can be improved.

Furthermore, the outer surface 16A and the inner surface 16B of the dashboard lower panel 16 according to this embodiment, for forming an engine room and for forming a space inside the car room, respectively, are coated with the coating film 22 by the electrode position coating, which makes it possible to increase durability of the outer surface 16A and the inner surface 16B. Especially, since the outer surface 16A is covered with the coating film 22, durability of the outer surface 16A to water and rust can be increased even if the outer surface 16A which is exposed to the outside air is exposed to the waterdrop such as the rainwater.

Moreover, in this embodiment, the thin plate blank 12 is subjected to the bending in the pressing of the joined thick plate blank 11 and the thin plate blank 12 so that the inner surface 12C of the thin plate blank 12 and the inner surface 11C of the thick plate blank 11 are made flush or almost flush with each other, whereby the insulator panel 21 for sound insulation, which is connected over the mash-seam welding portion 15 can be attached to the inner surface 16B of the dashboard lower panel 16 comprising the inner surface 11C and the inner surface 12C in a predetermined manner. Further, a plurality of parts which are attached separately to the inner surface 11C of the thick plate blank 11 and the inner surface 12C of the thin plate blank 12 can be attached with respect to either inner surface because the inner surfaces 11C and 12C are made flush or almost flush with each other.

Furthermore, when the front side frame 20 is connected to the outer surface 16A of the dashboard lower panel 16 and the insulator panel 21 is connected to the inner surface 16B thereof, each of which is connected over the mash-seam welding portion 15, the coating film 22 can be securely formed on the surface of the mash-seam welding portion 15 by the electrode position coating and the formation of rust can be prevented, because the portions 20A and 21A which correspond to the mash-seam welding portion 15 are spaced from the mash-seam welding portion 15.

Moreover, according to this embodiment, a material of the lower side of the dashboard lower panel 16 is the thick plate blank 11 so that the portion of the thick plate blank 11 can bear a load from the front side frame 20 effectively in a collision of the automobiles. Further, a material of the upper side of the dashboard lower panel 16 is the thin plate blank 12 so that the entire weight of the dashboard lower panel 16 can be decreased.

Furthermore, according to this embodiment, the bending as in FIG. 7 is performed onto the thin plate blank 12 by making the inner surface 12C of the thin plate blank 12, which is the surface inside the car room, flush or almost flush with the inner surface 11C of the thick plate blank 11 so that a concave portion 23 which arises between the thick plate blank 11 and the thin plate blank 12 as shown in FIG. 11 is formed in the inner surface 16B of the dashboard lower panel 16, which is inside the car room, not in the outer surface 16A of the dashboard lower panel 16, which is the engine room side to be exposed to the air. Thereby, in contrast to the case where the concave portion 23 is formed in the outer surface 16A of the dashboard lower panel 16, the problem of the formation of rust from the dashboard lower panel 16 over a long period of time since the waterdrop is collected in the concave portion 23 of the outer surface 16A which is exposed to the outside can be solved.

Figure 12:
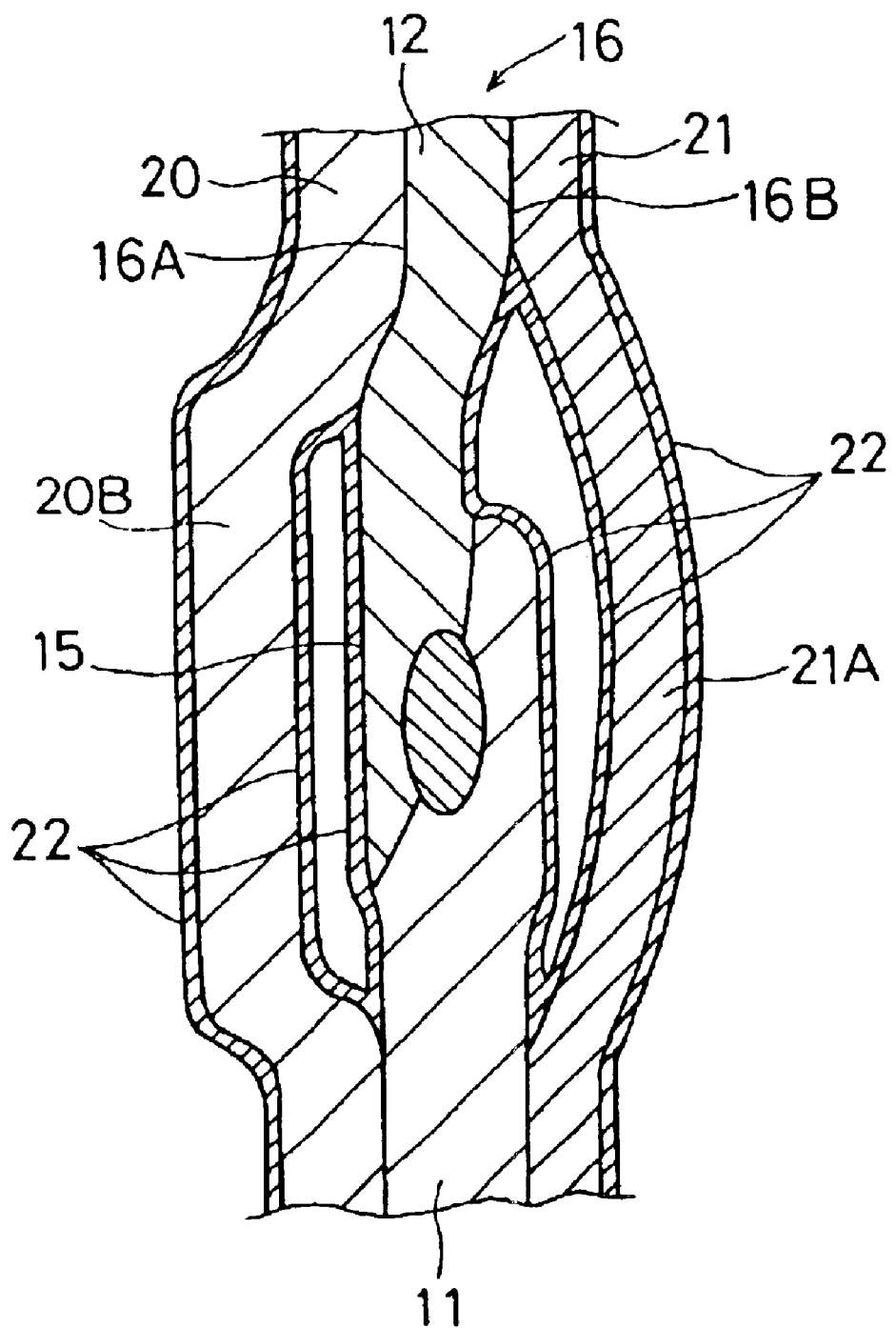
FIG. 12 is a view similar to FIG. 11, showing a modified example in which a portion in the front side frame which corresponds to the mash-seam welding portion has a different shape from the one in FIG. 11.

FIG. 12 is a modified example concerning a shape of a portion in the front side frame 20, which corresponds to the mash-seam welding portion 15. In this modified example, a portion 20B has a shape which is sharply spaced from the dashboard lower panel 16, different from the portion 20A in FIG. 11, having a shape which is gradually spaced from the dashboard lower panel 16.

The shape of the portion in the front side frame 20, which corresponds to the mash-seam welding portion 15 may be the one in FIG. 11 or the one in FIG. 12, which can be freely chosen by considering the easiness of its molding process and the connection strength to the dashboard lower panel 16.

Further, the connection part which is connected to the dashboard lower panel 16 over the mash-seam welding portion 15 is not limited to the front side frame 20 or the insulator panel 21, but may be any parts. As an example thereof, in FIG. 13, a reinforcing panel 24 is attached to the inner surface 16B of the dashboard lower panel 16 by the spot welding. A portion 24A in this panel 24, which corresponds to the mash-seam welding portion 15 is also spaced from the mash-seam welding portion 15 so that the electrode position coating solution enters therebetween.

Next, the embodiment in which a dashboard lower panel is manufactured by using a laser welding will be explained with reference to FIG. 14 to FIG. 21.

Figure 14:
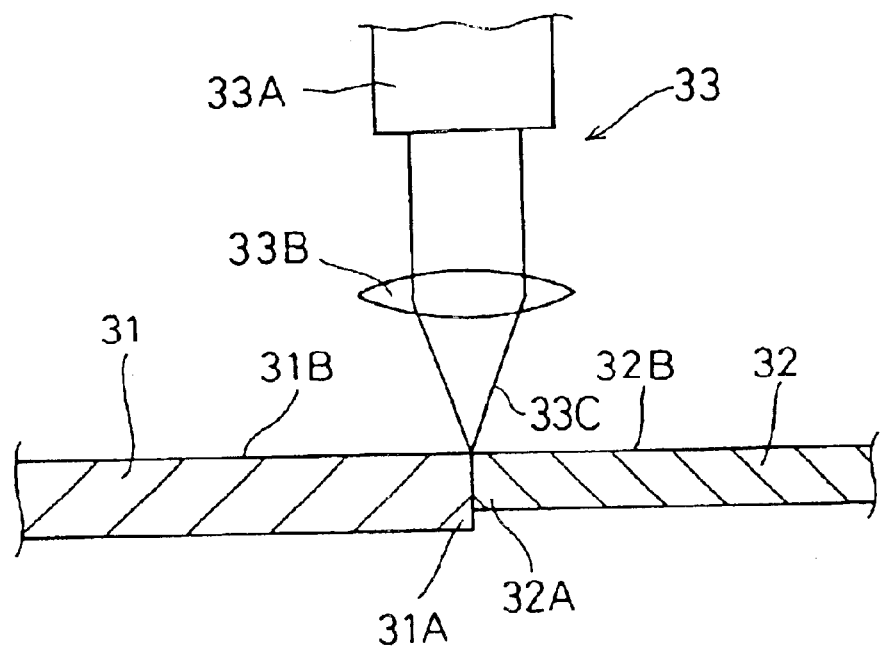
FIG. 14 is a vertical sectional view of a thick plate blank and a thin plate blank when joined together by a laser welding in an embodiment in which a dashboard panel is manufactured from the thick plate blank and the thin plate blank joined by the laser welding.

As shown in FIG. 14, both blanks 31 and 32 are clamped while outer surfaces 31B and 32B of a thick plate blank 31 and a thin plate blank 32 are made flush or almost flush with each other and respective end portions 31A and 32A are matched. The end portions 31A and 32A are welded and joined by a laser light 33C from a laser welding device 33 which has a generator 33A and a condenser lens 33B.

Figure 15:
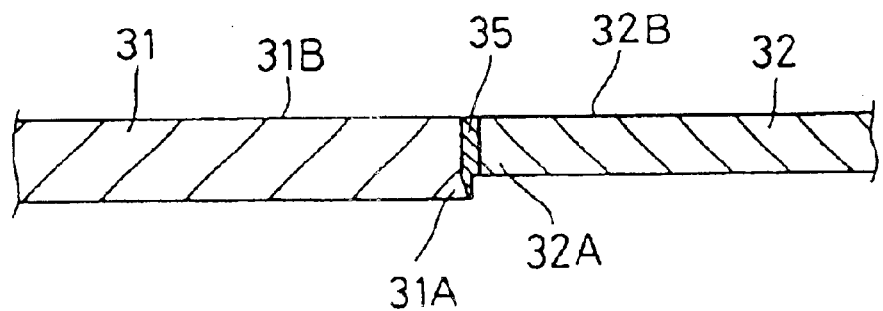
FIG. 15 is a vertical sectional view of the thick plate blank and the thin plate blank after the laser welding.

FIG. 15 shows the thick plate blank 31 and the thin plate blank 32 after the laser welding, in which a joining portion of the end portions 31A and 32A is a laser welding portion 35 and the outer surface 31B of the thick plate blank 31 and the outer surface 32B of the thin plate blank 32 are made uninterrupted or almost uninterrupted.

Figure 16:
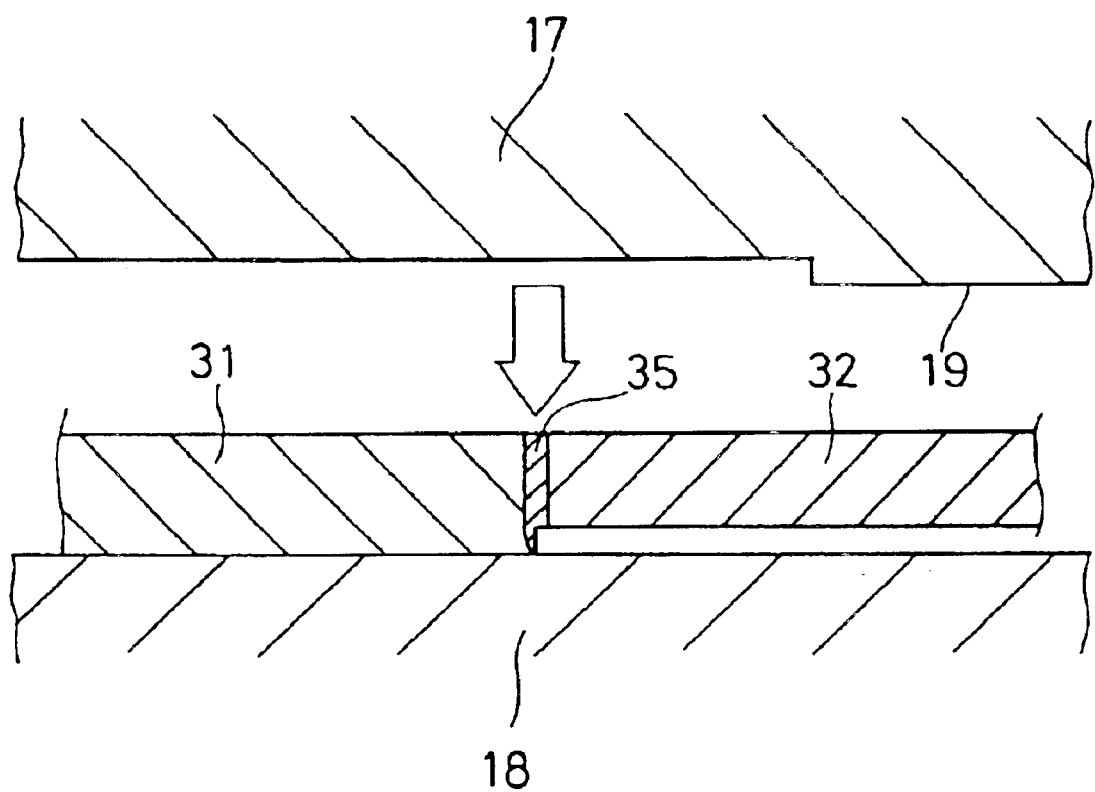
FIG. 16 is a vertical sectional view showing a state in which the thin plate blank undergoes a bending.
Figure 17:
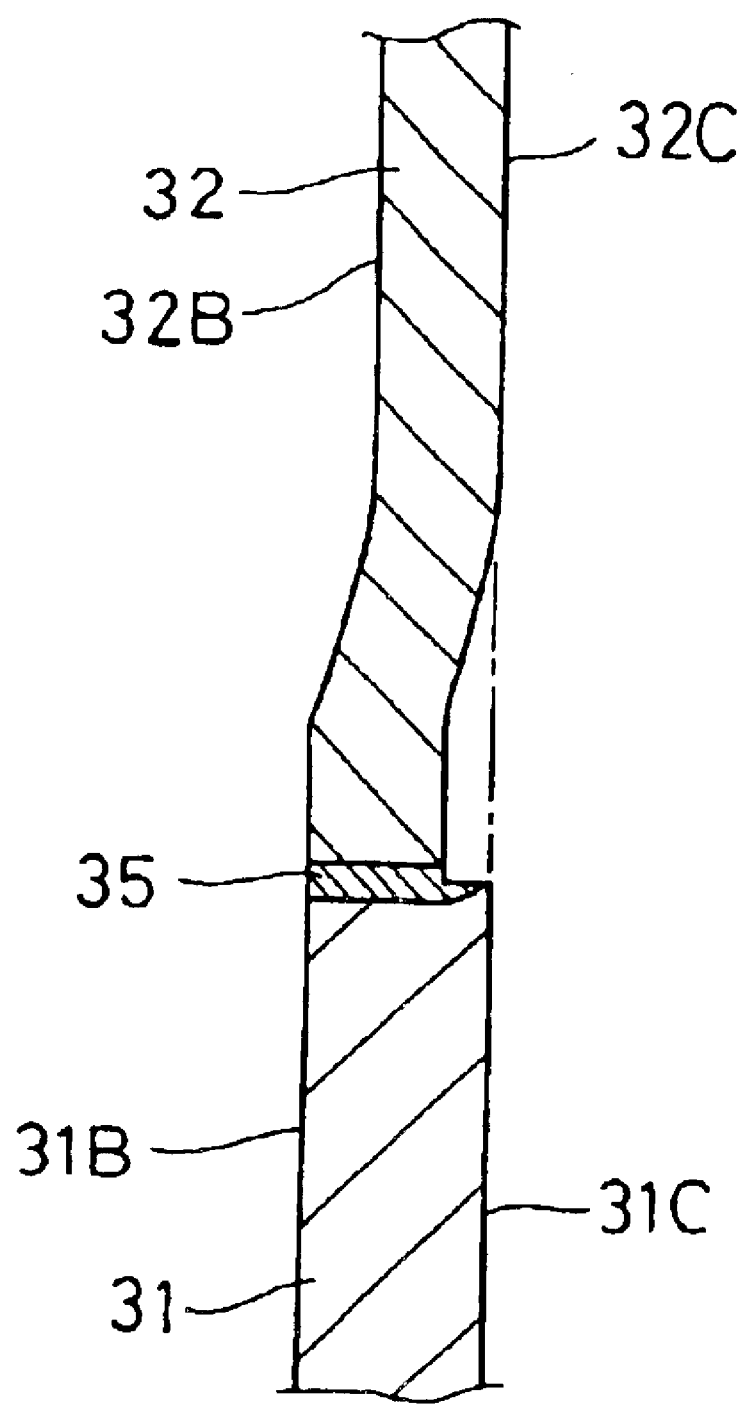
FIG. 17 is a vertical sectional view of the thick plate blank and the thin plate blank after the bending.
Figure 18:
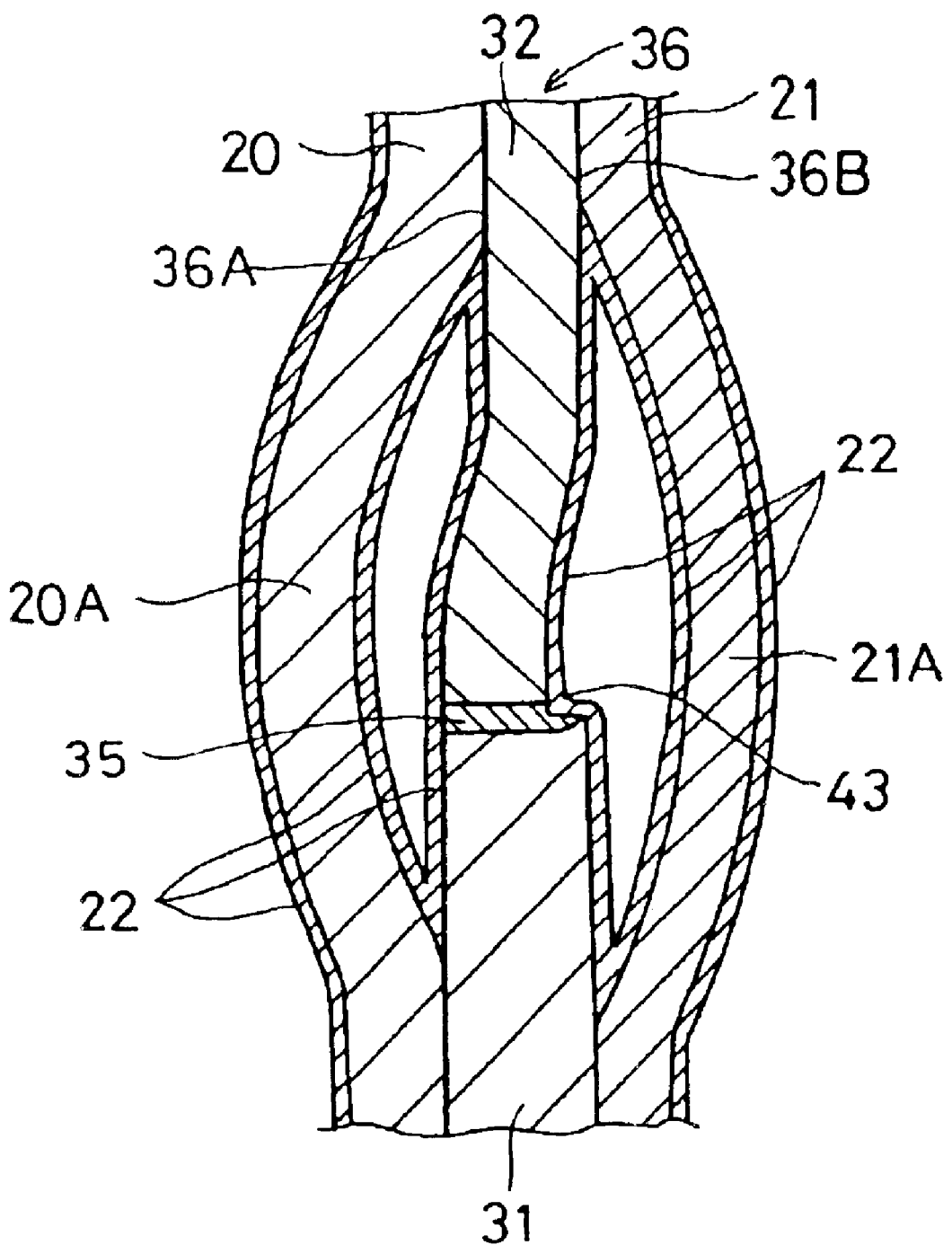
FIG. 18 is a vertical sectional view of a laser welding portion of the dashboard lower panel connected with a front side frame to an outer surface thereof and an insulator panel for sound insulation to an inner surface thereof.

Subsequent working process is the same with that of the aforesaid mash-seam welding. Namely, the thick plate blank 31 and the thin plate blank 32 undergo a transfer pressing to manufacture a dashboard lower panel 36 of the blanks 31 and 32, and a bending of the thin plate blank 32 is performed by an upper die 17 and a lower die 18 in the transfer pressing as shown in FIG. 16. Thereby, as shown in FIG. 17, an inner surface 32C of the thin plate blank 32 and an inner surface 31C of he thick plate blank 31 are made flush or almost flush with each other. Next, as shown in FIG. 18, a front side frame 20 is attached to an outer surface 36A of the dashboard lower panel 36 and an insulator panel 21 for sound insulation is attached to an inner surface 36B thereof, respectively by the spot welding. Portions 20A and 21A in the front side frame 20 and the insulator panel 21, each of which corresponds to the laser welding portion 35, are spaced from the welding portion 35.

Thereafter, a car body which comprises the dashboard lower panel 36 attached with the front side frame 20 and the like, a dashboard upper panel, a front lower panel, a front pillar inner lower panel and so on is subjected to an electrode position coating and the outer surface 36A and the inner surface 36B of the dashboard lower panel 36, including the laser welding portion 35, are coated with a coating film 22.

In the laser welding like this, the same effects as those in the aforesaid mash-seam welding can be obtained, in comparison with the spot welding. Among these effects, such an effect is included as the formation of rust from the outer surface 36A which is exposed to the outside can be prevented over a long period of time because a concave portion 43 between the thick plate blank 31 and the thin plate blank 32, as shown in FIG. 18, is formed in the inner surface 36B of the dashboard lower panel 36, which is the inside of the car room, not in the outer surface 36A which is the engine room side.

Moreover, in the laser welding, it is not necessary to overlap the end portions 31A and 32A of the thick plate blank 31 and the thin plate blank 32 together so that the weight of the dashboard lower panel can be further decreased by the same weight thereof and material yield can be further improved.

Figure 19:
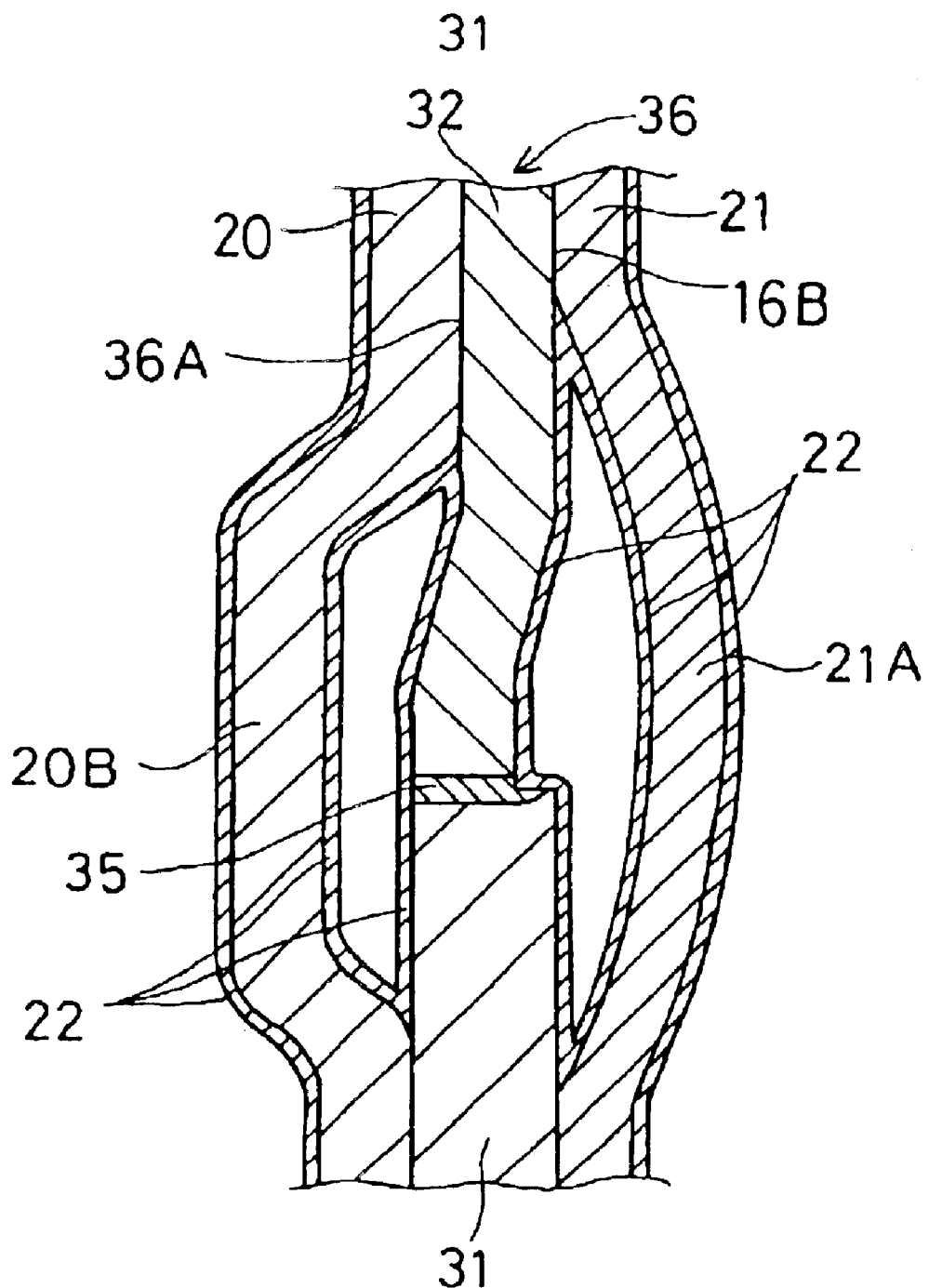
FIG. 19 is a view similar to FIG. 18, showing a modified example in which a portion in the front side frame which corresponds to the laser welding portion has a different shape from the one in FIG. 18.

In the laser welding, as shown in FIG. 19, a portion 20B in the front side frame 20, which corresponds to the laser welding portion 35 may also have a shape which is sharply spaced from the dashboard lower panel 36.

Further, the connection part which is connected to the dashboard lower panel 36 over the laser welding portion 35 may be a reinforcing panel similarly to FIG. 13.

Figure 20:
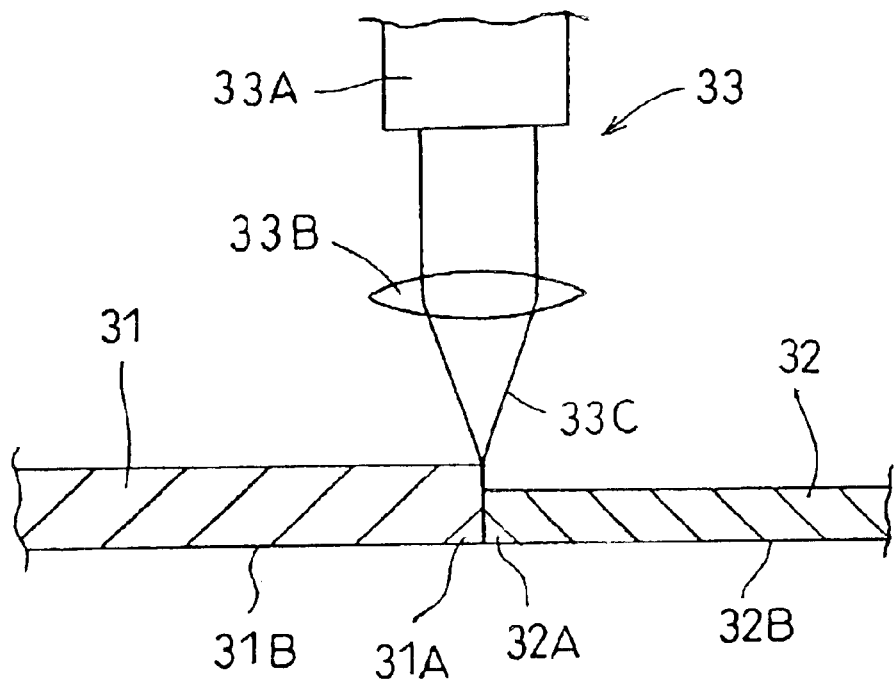
FIG. 20 is a vertical sectional view of a thick plate blank and a thin plate blank of an embodiment in which outer surfaces of the thick plate blank and the thin plate blank which are made flush or almost flush with each other face the opposite side from a laser device, which is different from FIG. 14.
Figure 21:
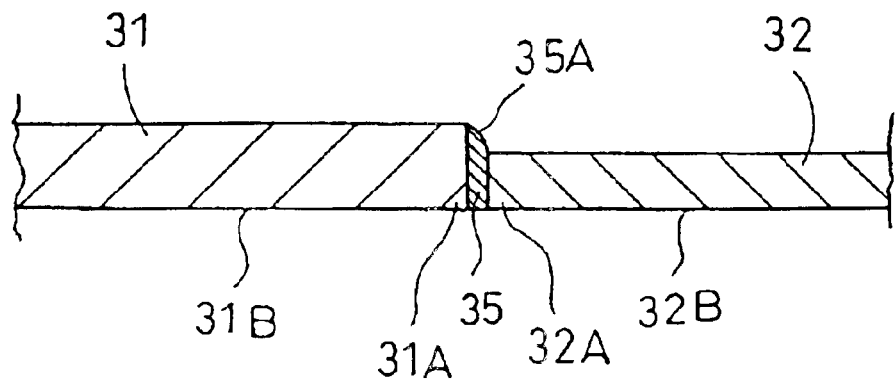
FIG. 21 is a vertical sectional view of the thick plate blank and the thin plate blank after the laser welding as in FIG. 20.

Furthermore, as shown in FIG. 20, when the thick plate blank 31 and the thin plate blank 32 are joined with the respective end portions 31A and 32A being matched, the outer surfaces 31B and 32B of these blanks 31 and 32, which are made flush or almost flush with each other, may downwardly face the opposite side from the laser device 33. Thereby, the thick plate blank 31 and the thin plate blank 32 can be clamped by a clamping device while the outer surfaces 31B and 32B are placed on the flat working table. An upper part 35A of thus-welded laser welding portion 35 is dripped as shown in FIG. 21.

INDUSTRIAL AVAILABILITY

As described above, the tailored blank article and the manufacturing method thereof according to the present invention are effectively applied to the case in manufacturing the article for partitioning the inside and the outside, such as the dashboard panel for partitioning the engine room and the inside of the car room of the car body, with the tailored blank.

What is claimed is:

1. A tailored blank article comprising a thick plate blank having an inner surface and an outer surface and a thin plate blank having an inner surface and an outer surface, an inner end surface of the thin plate blank overlapping an end outer surface of the thick plate blank and being joined to the end outer surface of the thick plate blank by mash-seam welding to form a mash-seam welding portion having a nugget portion formed from the thin plate blank and thick plate blank contained therein and a thickness of less than the combined thickness of the thin plate blank and the thick plate blank, the thin plate blank being bent so that a substantial portion of its inner surface is in substantial alignment with a substantial portion of the inner surface of the thick plate blank.

2. The tailored blank article of claim 1, wherein the thin plate blank is disposed at an upper side of an article and the thick plate blank is disposed at a lower side of the article.

3. The tailored blank article of claim 2, wherein the article is used in the manufacture of an automobile.

4. The tailored blank article of claim 3, wherein the article is a dashboard lower panel.

5. The tailored blank article of claim 4, wherein a front side frame is attached to an outer surface of the thick plate blank and the thin plate blank and an insulator panel for sound insulation is attached to an inner surface of the thick plate blank and the thin plate blank.

6. A tailored blank article comprising a thick plate blank having an inner surface and an outer surface and a thin plate blank having an inner surface and an outer surface, an edge surface of the thick plate blank being joined to an edge surface of the thin plate blank by laser welding to form a laser welding portion having a thickness equivalent to the thickness of the thick plate blank, the thin plate blank being bent so that a substantial portion of its inner surface is in substantial alignment with a substantial portion of the inner surface of the thick plate blank.

7. The tailored blank article of claim 6, wherein the thin plate blank is disposed at an upper side of an article and the thick plate blank is disposed at a lower side of the article.

8. The tailored blank article of claim 7, wherein the article is used in the manufacture of an automobile.

9. The tailored blank article of claim 8, wherein the article is a dashboard lower panel.

10. The tailored blank article of claim 9, wherein a front side frame is attached to an outer surface of the thick plate blank and the thin plate blank and an insulator panel for sound insulation is attached to an inner surface of the thick plate blank and the thin plate blank.

11. The tailored blank article of claim 7, wherein a portion of the outer surface of the thin plate blank is flush and in substantial alignment with the outer surface of the thick plate blank.

* * * * *